United States Patent
Wang et al.

(10) Patent No.: US 11,184,949 B1
(45) Date of Patent: Nov. 23, 2021

(54) DYNAMIC FREQUENCY SELECTION CHANNEL ASSESSMENT MECHANISM

(71) Applicant: Amazon Technologies, Inc., Seattle, WA (US)

(72) Inventors: Yufeng Wang, Campbell, CA (US); Shao-Cheng Wang, Santa Clara, CA (US); Qinghai Gao, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 38 days.

(21) Appl. No.: 16/849,673

(22) Filed: Apr. 15, 2020

(51) Int. Cl.
*H04W 16/14* (2009.01)
*H04W 84/12* (2009.01)
*H04W 48/20* (2009.01)
*H04W 48/16* (2009.01)
*H04W 88/08* (2009.01)

(52) U.S. Cl.
CPC .......... *H04W 84/12* (2013.01); *H04W 16/14* (2013.01); *H04W 48/16* (2013.01); *H04W 48/20* (2013.01); *H04W 88/08* (2013.01)

(58) Field of Classification Search
CPC ..... H04W 84/12; H04W 88/08; H04W 48/20; H04W 16/14; H04W 48/16
See application file for complete search history.

(56) References Cited

U.S. PATENT DOCUMENTS

| 2010/0246554 A1* | 9/2010 | Alapuranen | H04W 40/22 370/343 |
| 2016/0088631 A1* | 3/2016 | Hedayat | H04B 7/063 370/329 |
| 2021/0160198 A1* | 5/2021 | Kulkarni | G06F 12/0864 |

* cited by examiner

*Primary Examiner* — Said M Elnoubi
(74) *Attorney, Agent, or Firm* — Lowenstein Sandler LLP

(57) ABSTRACT

Technologies directed to Dynamic Frequency Selection (DFS) channel assessment mechanisms are described. A processing device of a first wireless device identifies a channel identifier corresponding to a first operating channel being used by a first radio of the first wireless device to communicate with a first access point (AP) enabled on a radio of a second wireless device. The processing device identifies multiple devices in proximity to the first wireless device using a second radio. The processing device determines an airtime utilization percentage value for each operating channel of the second radio and determines a number of radar events for each DFS channel. The processing device determines a second channel identifier having a fewest number of radar events and selects a second operating channel for a second AP on the second radio, the second channel corresponding to the second operating channel.

20 Claims, 9 Drawing Sheets

| Region | 2.4 GHz | 5GHz UNII-1 (CH 36-48) | 5GHz UNII-2 (DFS CH 52-64) | 5GHz UNII-2e (DFS CH 100-144) | 5GHz UNII-3 (CH 149-165) |
|---|---|---|---|---|---|
| US/CA/IN/AU/NZ/MX | Depends on 5GHz CH for 1st AP and DCAM/ACCAM 422 | UNII-3 band CH based on ACCAM 424 | UNII-3 band CH based on ACCAM 426 | UNII-1 band CH based on ACCAM 428 | UNII-1 band CH based on ACCAM 430 |
| EU | Depends on 5GHz CH for 1st AP and DCAM/ACCAM 432 | same as primary CH or UNII-3 if all endpoint devices support UNII-3 434 | CH 36 or UNII-3 if all endpoint devices support UNII-3 436 | UNII-1 band CH based on ACCAM 438 | UNII-1 band CH based on ACCAM 440 |
| JP | Depends on 5GHz CH for 1st AP and DCAM/ACCAM 442 | If all endpoint devices support UNII-2e, select UNII-2e CH based on DCAM; otherwise, select primary WLAN channel 444 | If all endpoint devices support UNII-2e, select UNII-2e CH based on DCAM; otherwise, select UNII-1 CH based on ACCAM 446 | If all endpoint devices support UNII-2, select UNII-2 CH based on DCAM; otherwise, select UNII-1 CH based on ACCAM 448 | N/A 450 |

FIG. 4

DYNAMIC FREQUENCY SELECTION CHANNEL ASSESSMENT MECHANISM

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

A wireless mesh network may support establishing point-to-point wireless links between the participating communication devices. A network device may utilize the wireless mesh network for accessing digital content stored on one or more digital content servers within or outside of the mesh network.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 4 is a table with selection rules based on a region, statistics from automatic clear channel assessment mechanism (ACCAM), numbers of radar events from DCAM and a primary channel selected for the first AP according to one embodiment.

DETAILED DESCRIPTION

Figure 1:
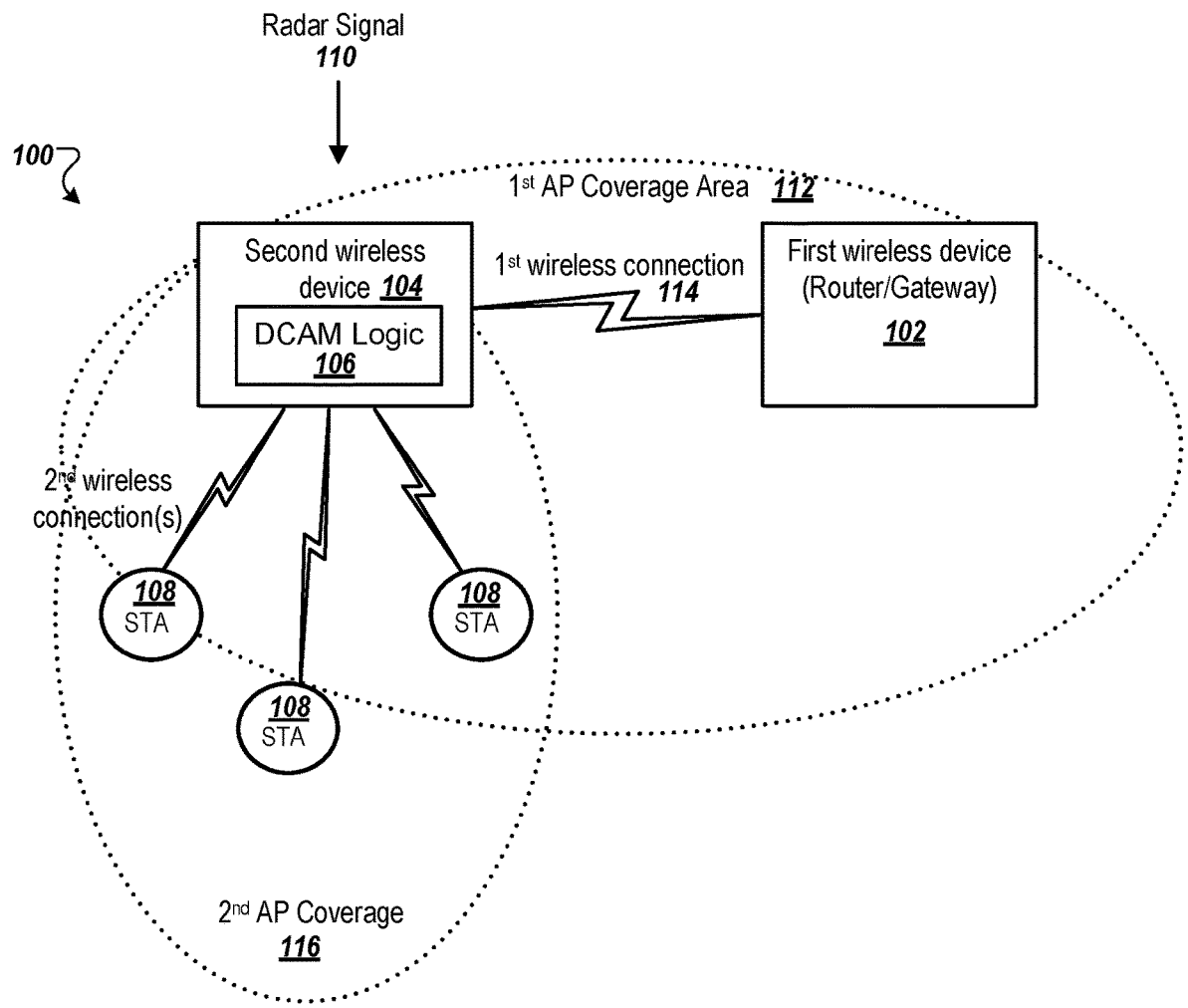
FIG. 1 is a network diagram of a home wireless network 100 with a first wireless device providing a first access point (AP) for internet access and a second wireless device including Dynamic Frequency Selection channel assessment mechanisms (DCAM) logic for providing a second AP to one or more endpoint devices according to one embodiment.

Technologies directed to DCAM are described. The DCAM can be used for a Wi-Fi® host access point (AP). The Wi-Fi® host AP can be implemented in a voice controlled device, a TV dongle, or other devices that have at least two Wi-Fi® radios. Alternatively, the DCAM can be used for other wireless local area network (WLAN) technologies, personal area network (PAN) technologies, or the like. The primary radio of the Wi-Fi® host AP can be used to connect a home AP (e.g., wireless router or gateway) for internet access, whereas a second radio can be used to create a second Wi-Fi® network as a host AP and to connect to one or more client devices, such as audio video lip synchronization (AVLS) slave speakers. Because both radios can operate in the same band concurrently, a good channel selection mechanism is needed to avoid any coexistence issues. A first channel for the primary radio is decided by the home AP, unless manually requested to be changed by a user. The DCAM can be used for channel selection for the secondary radio. The channel selection can be done before establishing the second Wi-Fi® network as the host AP with respect to the client devices. Selection of the second channel as described herein avoids coexistence issues and high congestion issues by selecting an appropriate second channel for the second Wi-Fi® network. A processing device of a first wireless device identifies a channel identifier corresponding to a first operating channel being used by a first radio of the first wireless device to communicate with a first access point (AP) enabled on a radio of a second wireless device. The processing device identifies multiple devices in proximity to the first wireless device using a second radio. The processing device determines an airtime utilization percentage value for each operating channel of the second radio and determines a number of radar events for each DFS channel. The processing device determines a second channel identifier having a fewest number of radar events and selects a second operating channel for a second AP on the second radio, the second channel corresponding to the second operating channel.

Aspects of the present disclosure address the above and other deficiencies of channel congestion and coexistence by selecting, for a secondary radio, a secondary channel that creates as much separation as possible from a primary channel for a primary radio and that is less congested as compared to other available channels. The separation of the two channels avoids coexistence issues. To select a less congested channel, aspects of the present disclosure determines statistical data of each of the channels, including airtime utilization percentage values per channel, and a number of radar events recorded for each of the DFS channels. Airtime utilization is a per-channel statistic that defines what percentage of a channel is currently being used, and what percentage is therefore free. The airtime utilization can be expressed as a percentage value. Selecting a DFS channel with a fewest number of radar events results in a selection of a secondary channel that is a relatively cleaner and stable channel, avoiding congestion issues and channel switching issues.

FIG. 1 is a network diagram of a home wireless network 100 with a first wireless device 102 providing a first access point (AP) for internet access and a second wireless device 104, including DCAM logic 106, for providing a second AP to one or more endpoint devices 108 according to one embodiment. The second wireless device 104 can include radar detection capability to detect and track radar events. An incoming radar signal 110 can be detected by the second wireless device 104 on any one of the DFS channels. The second wireless device 104, the first wireless device 102, and the one or more endpoint devices 108 can operate in at least one DFS channel, such as channel 60, channel 52, and channel 100. The first wireless device 102 can provide a first AP to wireless devices in a first AP coverage area 112. The second wireless device 104 can establish a first wireless connection 114 with the first wireless device 102. The first wireless device can be a router or a gateway and can provide internet access to the second wireless device 104. The second wireless device can provide a second AP to wireless devices in a second AP coverage area 116. The second wireless device 104 can establish one or more second wireless connections 118 with the one or more endpoint devices 108. The one or more endpoint devices 108 can be a wireless display, a wireless speaker, a game console, a wireless game pad, or the like. In some cases, the one or more endpoint devices 108 do not have radar detection capability, but the second wireless device 104 can provide DFS coverage to permit the endpoint devices 108 to operate on the DFS channels without performing their own radar detection, channel availability check, or managing channel switches. The one or more endpoint devices 108 do not necessarily need to be within the first AP coverage area 112. In one embodiment, the one or more endpoint devices 108 are AVLS slave speakers that require low latency for proper operation.

In one example, the second wireless device 104 is a voice controlled device with dual wireless local area network (WLAN) radios and the one or more endpoint devices 108 are AVLS slave speakers. A primary radio is used to connect the second wireless device 104 to a home AP, provided by the first wireless device 102, for internet access. A secondary radio is used to create a second WLAN as a host AP for connecting the AVLS slave speakers. Both WLAN radios can operate in the same band concurrently, thus, it requires a good channel selection mechanism to avoid the coexistence issues. A first WLAN channel of the primary radio is decided by the home AP (i.e., first wireless device 102). The second wireless device 104 does not have the ability to select the first WLAN channel unless a user of the second wireless device 104 manually requests a channel change. The second wireless device 104, however does have the ability to select a second WLAN channel before establishing the second WLAN to avoid coexistence issues and avoid high congestion issues. The DCAM logic 106 provides this functionality. The key idea of the DCAM logic 106 is to select a second WLAN channel that creates as much separation as possible from the first WLAN channel to avoid coexistence issues. In addition, the DCAM logic 106 is to select a relatively cleaner channel for the second WLAN channel to avoid the high congestion issues. In addition, the DCAM logic 106 is to select a relatively more stable channel for the second WLAN channel to avoid channel switching issues. The DCAM logic 106 provides an easy way to make the joint channel assessment and selection. DCAM logic 106 can select the second WLAN channel based on radar event data. The radar event data can be a number of radar events that have occurred on each of the DFS channels or a specified period of time. The radar event data can include other statistics, counts, or metrics that represent how radar events have affected the DFS channels. The DCAM logic 106 can also obtain channel data, such as airtime utilization percentage values for each of the channels in order to determine which DFS channels or non-DFS channels are relatively less congested. Some of the DCAM logic 106 does not have to rely on radio frequency (RF) channel information at the time that the DCAM logic 106 is triggered. The DCAM logic 106 can use the joint information of the first AP and the recorded number of radar detection events observed on devices over a longer term, i.e., a recording period, to make a final channel selection.

In one example, the second wireless device 104 is a wireless media device, such as a TV dongle with dual WLAN radios and the one or more endpoint devices 108 are AVLS slave speakers. The DCAM logic 106 of the wireless media device can operate in a similar manner as described above with respect to the voice controlled device.

In one embodiment, the DCAM logic 106 performs the following operations: 1) DCAM logic 106 first scans all the supported channels to find the number of APs and airtime utilization percentage values per CH. It also obtains the operating channel of the first AP through scanning. 2) With the combined information from operation 1), DCAM logic 106 selects a default channel based on Clean Channel Assessment Mechanism (CCAM) logic, which operates in the following operations: 2.1). CCAM logic finds target channel candidates from the frequency bands other than the first AP; and 2.2). CCAM logic selects the channel with the smallest airtime utilization percentage value amongst the number of APs. 3) After selecting a default channel from operation 2), DCAM logic 106 starts maintaining a hashmap with the key as a DFS channel and its value as the number of radar events recorded on that channel over the period of usage. In addition, the hashmap can be arranged by a descending order of its values and saved in a database, i.e., whenever a DFS channel is selected and a radar event is detected, the hashmap can be updated and its order re-arranged. 4) Every time the DCAM logic 106 is triggered, a top channel in the hashmap from the other bands than the first AP's band AP will be selected as a final operating channel for the second WLAN channel. The top channel represents the DFS channel having a fewest number of radar events recorded on that channel over the period of usage. 5) Once a DFS channel has been selected for the second WLAN channel, it remains operating on that channel until the DCAM logic 106 is triggered again or a radar event is detected. 6) If a change to the Basic Service Set Identifiers (BSSID) is detected, the hashmap will be cleared to take account for an environmental change. It should be noted that a hashmap is one type of data structure that stores a key and value pair, denoted as "HashMap<Key,Vaule>" or "HashMap<K,V>. The hashmap can permit null values and null keys. The hashmap can be sorted or unsorted. Alternatively, the number of recorded radar events can be tracked in other data structures on a per-channel basis.

Figure 2:
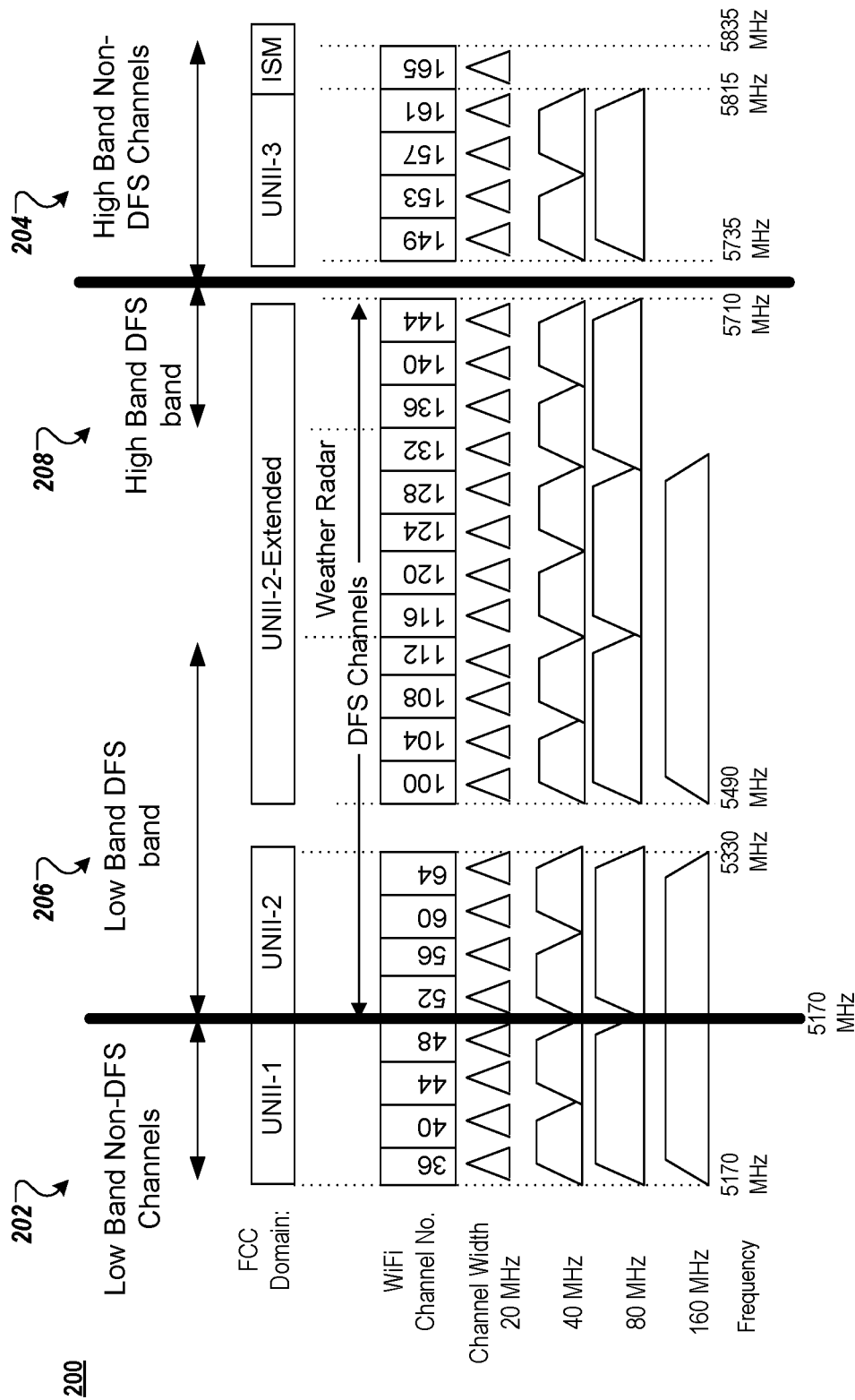
FIG. 2 is a graph that illustrates channel allocation by radios under a wireless local area network (WLAN) protocol including Dynamic Frequency Selection (DFS) channels and non-DFS channels according to an embodiment.

FIG. 2 is a graph 200 that illustrates channel allocation by radios under a wireless local area network (WLAN) protocol including DFS channels (in bands 206, 208) and non-DFS channels 202, 204 according to an embodiment. Across the top of the graph 200 are various UNII bands, which fall into Federal Communication Commission (FCC) regulated domains. The UNII-2 and UNII-2-Extended domains include DFS channels and overlapping channels for weather radar. Below the domain identifications are WiFi® channels, and below the WiFi® channels are illustrated potential communication link bandwidths that would subsume the above-identified WiFi® channels. For example, each discrete WiFi® channel spans over 20 MHz, and so any adjacent pair of channels spans 40 MHz, any series of four channels spans 80 MHz, and any series of eight channels spans 160 MHz.

Although a radio may operate on one primary channel (e.g., channel (CH) 100), a radio can operate on a wider channel bandwidth such as over a 40, 80, or 160 MHz. Radar detection, however, may occur most frequently on the primary 20 MHz channel. For example, consider bandwidth 80 MHz with primary channel 52 and secondary channels 56, 60, and 64 (each 20 MHz wide). An interference event present on the secondary channels 56, 60, and 64 may not be reported unless the communication link bandwidth is reduced to 20 MHz for detection purposes. A communication link in this case may be defined to operate on a channel and bandwidth that has one or more 20 MHz channels as a "DFS radar channel" or "DFS channel."

Recognizing the fact that a DFS radar channel may be considered to include multiple secondary channels, two channel bandwidths may be defined for the communication link, namely an operating channel bandwidth and a communication link bandwidth. In various embodiments, the operating channel bandwidth is fixed at a maximum channel bandwidth allowed by the WLAN protocol for receiving data within the first primary channel and multiple secondary channels between two wireless device devices.

In one embodiment, the operating channel bandwidth of the communication link is channel 80 MHz with primary channel 52, whereas the communication link bandwidth could be 20 MHz. In this case, the radios in the communication link perform 20 MHz frame exchange; however, the radios can still receive on the entire 80 MHz frequency band. The communication link bandwidth, however, could be expanded to include additional 20 MHz bands within the 80 MHz frequency band.

In the event of a radar event, a channel switch announcement (CSA) action frames can direct a device to switch from a DFS channel to a non-DFS channel as described herein. In some cases, the non-DFS channel is selected from a same frequency band group as the DFS channel. In particular, a non-DFS channel can be selected from a low band group of non-DFS channels 202 corresponding to a low band DFS band 206. The channels in the low band group of non-DFS channels 202 can have similar signal propagation characteristics, attenuation factors, and output power as the channels in the low band DFS band 206. Another DFS channel can be selected from a high band group of non-DFS channels 204 corresponding to a high band DFS band 208. The channels in the high band group of non-DFS channels 204 can have similar signal propagation characteristics, attenuation factors, and output power as the channels in the high band DFS band 208. For each band group, the non-DFS channel can be selected in order to minimize interference and avoid congestion and minimize interference.

Figure 3:
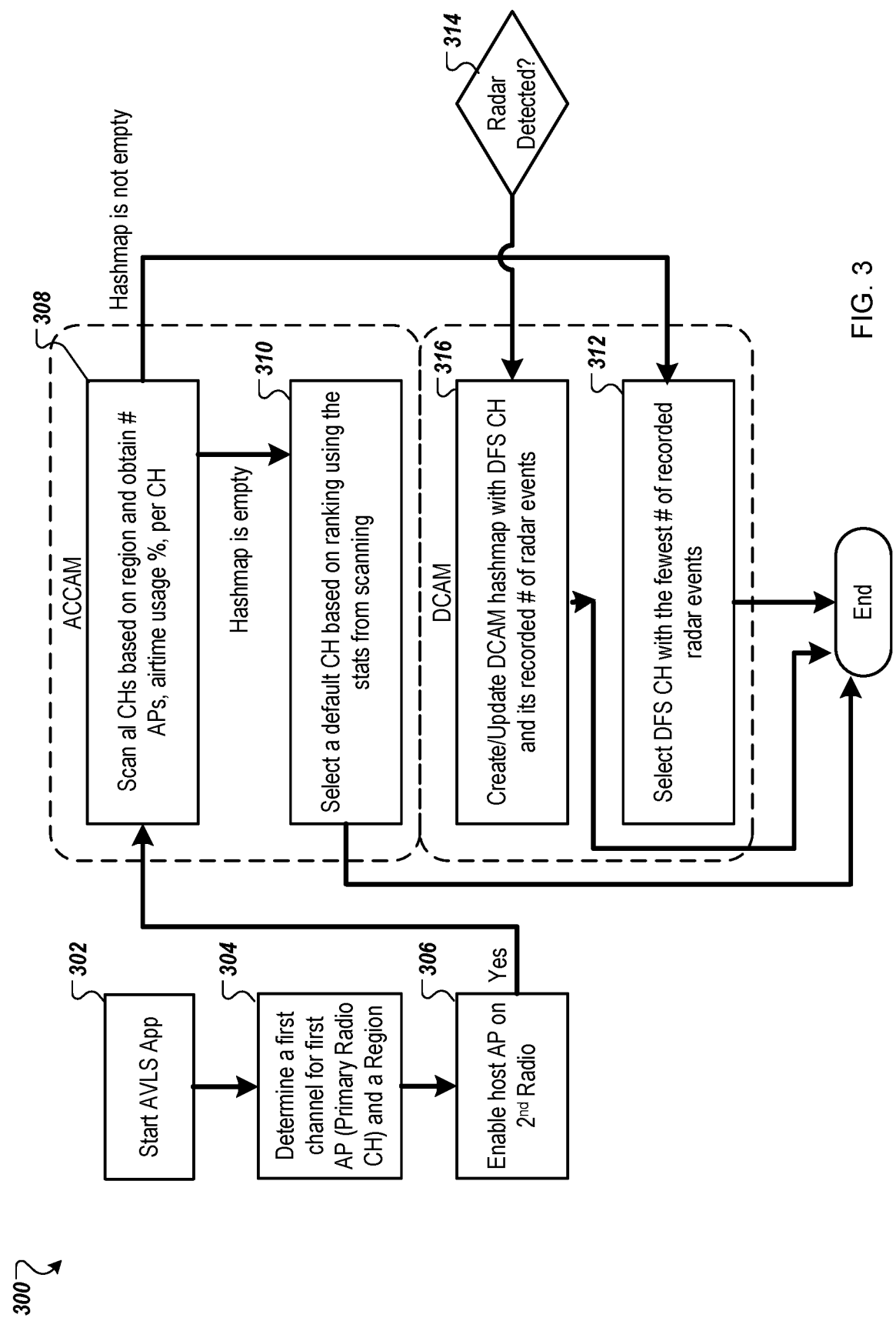
FIG. 3 is a flow diagram of a method of DFS channel assessment and selection according to one embodiment.

FIG. 3 is a flow diagram of a method 300 of DFS channel assessment and selection according to one embodiment. The method 300 may be performed by processing logic that comprises hardware (e.g., circuitry, dedicated logic, programmable logic, microcode, etc.), software, firmware, or a combination thereof. In one embodiment, the method 300 may be performed by DCAM logic 106. In another embodiment, the method 300 is performed by the second wireless device 104.

Referring back to FIG. 3, the processing logic begins by starting an AVLS application (block 302). The AVLS application can be an application that manages synchronization between audio and video, since the video can be displayed on a display and the audio is being played back on one or more endpoint devices, such as AVLS slave speakers. The AVLS application can be executed on an application processor that is coupled to a first WLAN radio and a second WLAN radio. The processing logic establishes a first wireless connection on the first channel with a second wireless device using the first WLAN radio (also referred to as the primary radio). The processing logic determines a first channel of the first WLAN radio and a region in which the wireless devices are located (block 304). The second wireless device operates as a first AP and provides Internet access. At block 306, the processing logic enables a second AP on the second WLAN radio. The processing logic then determines a second channel for the second AP using Automatic Clear Channel Assessment Mechanism (ACCAM) or DCAM as described below. The ACCAM and DCAM can be part of the DCAM logic 106 of FIG. 1.

For ACCAM, the processing logic scans all operating channels of the second WLAN radio based on the region and obtains statistics data from each of one or more nearby APs (block 308). The statistics data includes an airtime utilization percentage value per channel for each of the nearby APs. The statistics data can also include a number of nearby APs per channel. The processing logic, at block 308, determines whether a hashmap is empty. The hashmap is empty when there are no entries, there is no data, or the hashmap has null data. The hashmap is used to track, for each DFS channel, a count value representing a number of radar events recorded on a respective DFS channel. Responsive to a determination that the hashmap is empty, the processing logic select a default channel based on rankings using the statistics obtained from scanning (block 310). Responsive to a determination that the hashmap is not empty, the processing logic proceeds to DCAM.

For DCAM, the processing logic selects a DFS channel with a fewest number of recorded radar events (block 312); and the method 300 ends. DCAM can also be triggered by a radar event. The processing logic determines if a radar event is detected (block 314). If a radar event is detected at block 314, the processing logic creates or updates the hashmap with DFS channel and its recorded number of radar events (block 316). After creating or updating the hashmap at block 316, the processing logic proceeds to block 314 to select the DFS channel with the fewest number of recorded radar events; and the method 300 ends.

For an example, at a first time after the first wireless connection is established with the second wireless device on a first channel of the first AP and before a second wireless connection is establish with an endpoint device on a second channel for the second AP, the processing logic enables the second AP using the second WLAN radio at block 306 and obtains statistics data from each of the nearby APs by scanning all operating channels of the second WLAN radio at block 308. As noted above, the statistics data can include an airtime utilization percentage value per channel for each of the nearby APs. The processing logic will determine that the hashmap is empty at block 308 because this is the first time the second AP is enabled. The processing logic selects a second channel for the second WLAN radio, the second channel and the first channel being different. The processing logic establishes the second wireless connection with one or more endpoint devices on the second channel selected for the second WLAN radio.

The second WLAN radio can continue to use the third channel until a radar event is detected at block 314. Once the radar event is detected, the hashmap will be created. Thus, at a second time after the first time described above, the processing logic enables the second AP using the second WLAN radio at block 306 and obtains statistics data from each of nearby APs by scanning all operating channels of the second WLAN radio at block 308. The statistics data can include an airtime utilization percentage value per channel for each of the nearby APs. The processing logic determines that the hashmap is not empty at block 308. The hashmap can store a number of entries, each entry storing a DFS channel identifier as a key and a count value representing a number of radar events recorded on a DFS channel corresponding to the respective DFS channel identifier. The processing logic can identify, in the hashmap, a first DFS channel identifier having a lowest count value and selects a first DFS channel, corresponding to the first DFS channel identifier, for the second WLAN radio. The first DFS channel is different than the first channel for the first WLAN radio. The processing logic establishes a second wireless connection with one or more devices on the first DFS channel using the second WLAN radio.

In one embodiment, the wireless device (e.g., 104) can perform a first scan using the second WLAN radio. The first scan finds a set of neighbor devices in physical proximity to the wireless device (e.g., 102 and other nearby APs). The APs can be considered nearby when a signal strength indicator is greater than a specified signal strength threshold. The wireless device can determines a scan list with each of the nearby APs, as well as corresponding receive signal strength indicator (RSSI) values. The wireless device can determine a round trip time, angle of arrival of packets, serving channels (e.g., DFS serving channels and non-DFS serving channels), or the like. The angle of arrival is a value that represents an angle from which a device receives packets from a neighboring device. Calculating the angle of arrival is a technique for finding the direction that an incoming packet is coming from and calculating the angle of arrival can be the basis for triangulation of a device. For example, the a device can determine an angle of arrival from incoming packets from each neighboring device from which it receives packets and sends the angle of arrival for each device from which it receives packets.

In another embodiment, the processing logic can make a channel selection based on the region, statistics from ACCAM, and a primary channel selected for the first AP. An example of selection rules are set for the in the table of FIG. 4. That is, in addition to determining whether the hashmap is empty at block 308, the processing logic can use the region, statics from ACCAM and the primary channel selected for the first AP to determine whether to select a default channel at block 310 of a DFS channel at block 312.

FIG. 4 is a table 400 with selection rules based on a region 402, statistics from ACCAM, number of radar events from DCAM, and a primary channel 404 selected for the first AP according to one embodiment. The DCAM logic 106 of FIG. 1 can implement the selection rules as set forth in table 400. In particular, the DCAM logic 106 can determine a region 402 and a primary channel 404 selected for the first radio (also referred to as the primary radio or WLAN0). The regions of table 400 are separated into three regions: a first region 406, a second region 408, and a third region 410. In one embodiment, the first region 406 can represent multiple regions, such as the United States, Canada, India, Australia, New Zealand, Mexico, or the like. The second region 408 can be European Union (EU). The third region 410 can be Japan (JP). Alternatively, other regions can be accommodated in the selection rules. That is, additional rows or additional columns can be added for the particular frequency bands and the particular regions. In this example, the primary channel can be selected from one of the 2.4 GHz frequency band 412, the 5 GHz UNII-1 frequency band 414, the 5 GHz UNII-2 frequency band 416, the 5 GHz UNII-2e frequency band 418, or the 5 GHz UNII-3 frequency band 420. The 2.4 GHz frequency band 412 can include operating channels 1-14, corresponding to the frequency range of approximately 2.4 GHz to 2.495 GHz. Some regions may vary on the operating channels. The 5 GHz UNII-1 frequency band 414 can include channels 36-48. The 5 GHz UNII-2 frequency band 416 can include DFS channels 52-64. The 5 GHz UNII-2e frequency band 418 can include DFS channels 100-144. The 5 GHz UNII-3 frequency band 420 can include channels 149-165.

When the DCAM logic 106 determines that the first AP is located in the first region 406, the DCAM logic 106 selects a second channel for the second WLAN radio based on the primary channel selection. If the primary channel is selected from the channels in the 2.4 GHz frequency band 412, the DCAM logic 106 selects the second channel in one of the 5 GHz frequency bands (block 422) depending on the 5 GHz channel selected for the first AP and the DCAM or ACCAM as set forth above with respect to FIG. 3. If the first AP selects channel 1 in the 2.4 GHz and channel 149 in the 5 GHz frequency band as the primary operating channels, the DCAM logic 106 can select the second channel from either the 5 GHz UNII-2 frequency band 416 (e.g., DFS channels 52-64) or the 5 GHz UNII-2e frequency band 418 (DFS channels 100-144). Which channel is selected depends on the number or recorded radar events in the hashmap for DCAM or the statistics obtained in ACCAM as described above. If the primary channel is selected from operating channels in the 5 GHz UNII-1 frequency band 414, the DCAM logic 106 selects the second channel in the 5 GHz UNII-3 frequency band 420 based on the statistics obtained in ACCAM (block 424). If the primary channel is selected from operating channels in the 5 GHz UNII-2 frequency band 416, the DCAM logic 106 selects the second channel in the 5 GHz UNII-3 frequency band 420 based on the statistics obtained in ACCAM (block 426). If the primary channel is selected from operating channels in the 5 GHz UNII-2e frequency band 418, the DCAM logic 106 selects the second channel in the 5 GHz UNII-1 frequency band 414 based on the statistics obtained in ACCAM (block 428). If the primary channel is selected from operating channels in the 5 GHz UNII-3 frequency band 420, the DCAM logic 106 selects the second channel in the 5 GHz UNII-1 frequency band 414 based on the statistics obtained in ACCAM (block 430).

When the DCAM logic 106 determines that the first AP is located in the second region 408, the DCAM logic 106 selects a second channel for the second WLAN radio based on the primary channel selection. If the primary channel is selected from the channels in the 2.4 GHz frequency band 412, the DCAM logic 106 selects the second channel in one of the 5 GHz frequency bands (block 432) depending on the 5 GHz channel selected for the first AP and the DCAM or ACCAM as set forth above with respect to FIG. 3. If the primary channel is selected from operating channels in the 5 GHz UNII-1 frequency band 414, the DCAM logic 106 selects the second channel from the same frequency band as the primary channel or from the 5 GHz UNII-3 frequency band 420 if all endpoint devices support UNII-3 (block 434). If the primary channel is selected from operating channels in the 5 GHz UNII-2 frequency band 416, the DCAM logic 106 selects the second channel as channel 36 or from the 5 GHz UNII-3 frequency band 420 if all endpoint devices support UNII-3 (block 436). If the primary channel is selected from operating channels in the 5 GHz UNII-2e frequency band 418, the DCAM logic 106 selects the second channel in the 5 GHz UNII-1 frequency band 414 based on the statistics obtained in ACCAM (block 438). If the primary channel is selected from operating channels in the 5 GHz UNII-3 frequency band 420, the DCAM logic 106 selects the second channel in the 5 GHz UNII-1 frequency band 414 based on the statistics obtained in ACCAM (block 440).

When the DCAM logic 106 determines that the first AP is located in the third region 410, the DCAM logic 106 selects a second channel for the second WLAN radio based on the primary channel selection. If the primary channel is selected from the channels in the 2.4 GHz frequency band 412, the DCAM logic 106 selects the second channel in one of the 5 GHz frequency bands (block 442) depending on the 5 GHz channel selected for the first AP and the DCAM or ACCAM as set forth above with respect to FIG. 3. If the primary channel is selected from operating channels in the 5 GHz UNII-1 frequency band 414, the DCAM logic 106 selects the second channel from the 5 GHz UNII-2e frequency band 418 if all endpoint devices support UNII-2e based on DCAM; otherwise selects from the frequency range of the primary WLAN channel (block 444). If the primary channel is selected from operating channels in the 5 GHz UNII-2 frequency band 416, the DCAM logic 106 selects the second channel from the 5 GHz UNII-2e frequency band 418 if all endpoint devices support UNII-2e based on DCAM; otherwise selects from the 5 GHz UNII-1 frequency band 414 based on ACCAM (block 446). If the primary channel is selected from operating channels in the 5 GHz UNII-2e frequency band 418, the DCAM logic 106 the DCAM logic 106 selects the second channel from the 5 GHz UNII-2 frequency band 416 if all endpoint devices support UNII-2 based on DCAM; otherwise selects from the 5 GHz UNII-1 frequency band 414 based on ACCAM (block 448). Given the third region 410 does not include the 5 GHz UNII-3 frequency band 420, the primary channel cannot be selected in the 5 GHz UNII-3 frequency band 420 and there is no selection rule for this condition.

It should be noted that other selection rules can be defined for the different combinations of regions and primary channel selections.

Figure 5:
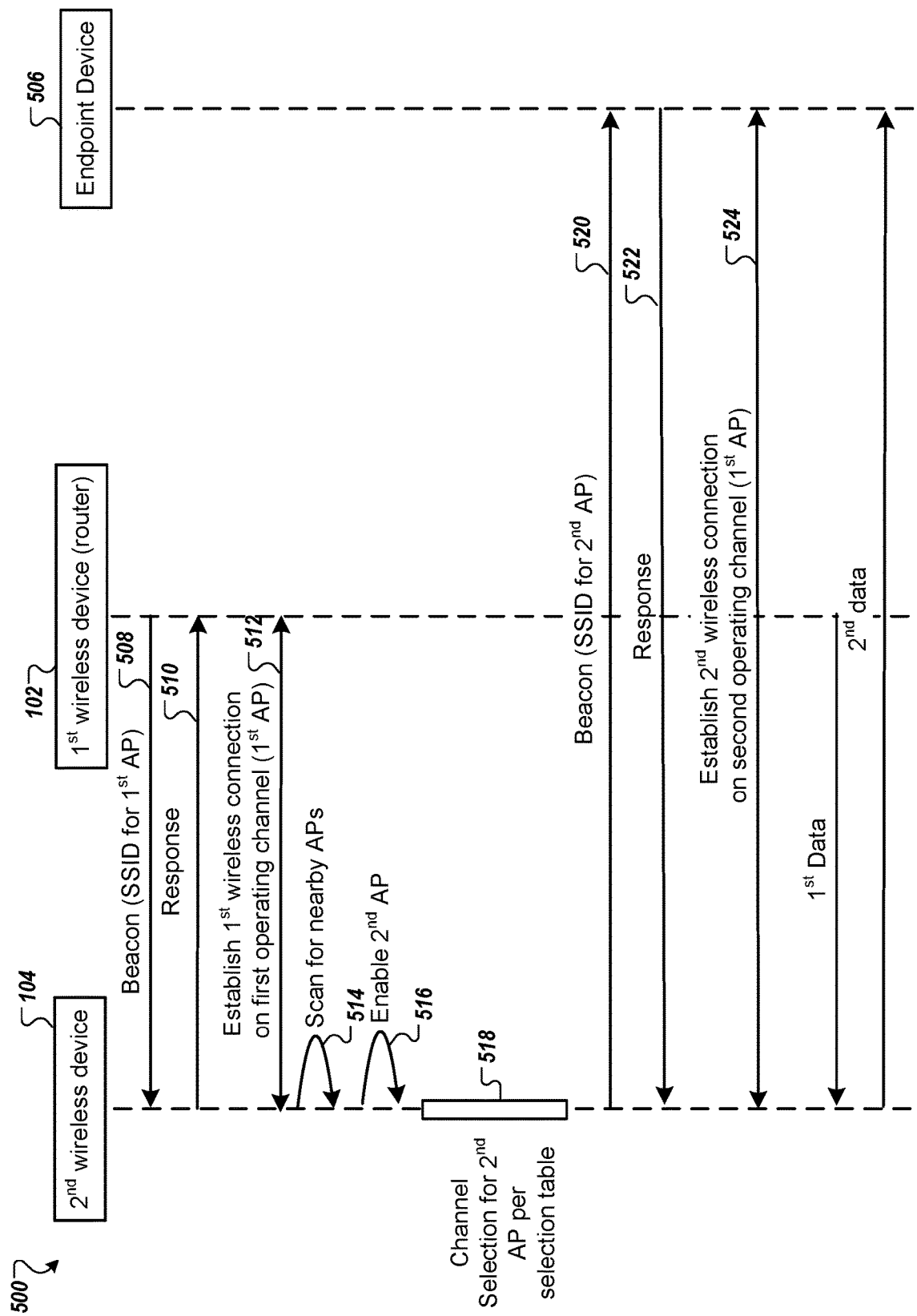
FIG. 5 is a sequence diagram of a method of operations of a first wireless device, a second wireless device, and an endpoint device according to one embodiment.

FIG. 5 is a sequence diagram of a method 500 of operations of a first wireless device, a second wireless device, and an endpoint device according to one embodiment. The method 600 may be performed by processing logic that comprises hardware (e.g., circuitry, dedicated logic, programmable logic, microcode, etc.), software, firmware, or a combination thereof. In one embodiment, the method 500 may be performed by any of the wireless devices described herein and illustrated with respect to FIGS. 1-4.

Referring back to FIG. 5, a first wireless device 102 sends a beacon frame (operation 508). The beacon frame can include a service set identifier (SSID) for a first access point for a first WLAN provided by the first wireless device 102. The first wireless device 102 can be a router that provides internet access to the second wireless device 104. The beacon can specify a first operating channel (i.e., a primary channel) used by the first wireless device 102 for the first AP. The second wireless device 104 sends a response back to the first wireless device 102 (operation 510). The second wireless device 104 and the first wireless device 102 can establish a first wireless connection on the first operating channel using a first radio of the second wireless device 104 (operation 512). After establishing the first wireless connection, the second wireless device 104 can scan for nearby APs (operation 514) and can enable a second AP on a second radio of the second wireless device 104 (operation 516). The second wireless device 104 can perform a channel selection process 518 to select a second operating channel for the second AP, such as described above with respect to method 300 of FIG. 3. The channel selection process 518 can be the operations of DCAM logic 106 of FIG. 1. Alternatively, the channel selection process can include any of the operations described above with respect to FIGS. 1-4. The second operating channel can be selected by the channel selection process 518 to create as much separation as possible between the first operating channel and the second operating channel. The second operating channel can also be selected based on statistics, such as the airtime utilization percentage values of the channels, the number of radar events recorded on the DFS channels, or any combination thereof.

Once the second operating channel is selected for the second AP, the second wireless device 104 sends a beacon frame with a second SSID for the second AP (operation 520). An endpoint device 108 receives the beacon frame and sends a response (operation 522). The second wireless device 104 and the endpoint device 108 establish a second wireless connection on the second operating channel using the second radio of the second wireless device 104 (operation 524). After establishing the second wireless connection, the second wireless device 104 can receive first data over the first wireless connection from the first wireless device 102 and can send second data over the second wireless connection to the endpoint device 108. In one example, the second wireless device 104 can request media content from the internet over the first wireless connection to the first wireless device 102. The media content can be played back on the second wireless device 104 and can include sending audio data to the endpoint device 108, which could be an AVLS slave speaker as described herein.

Figure 6:
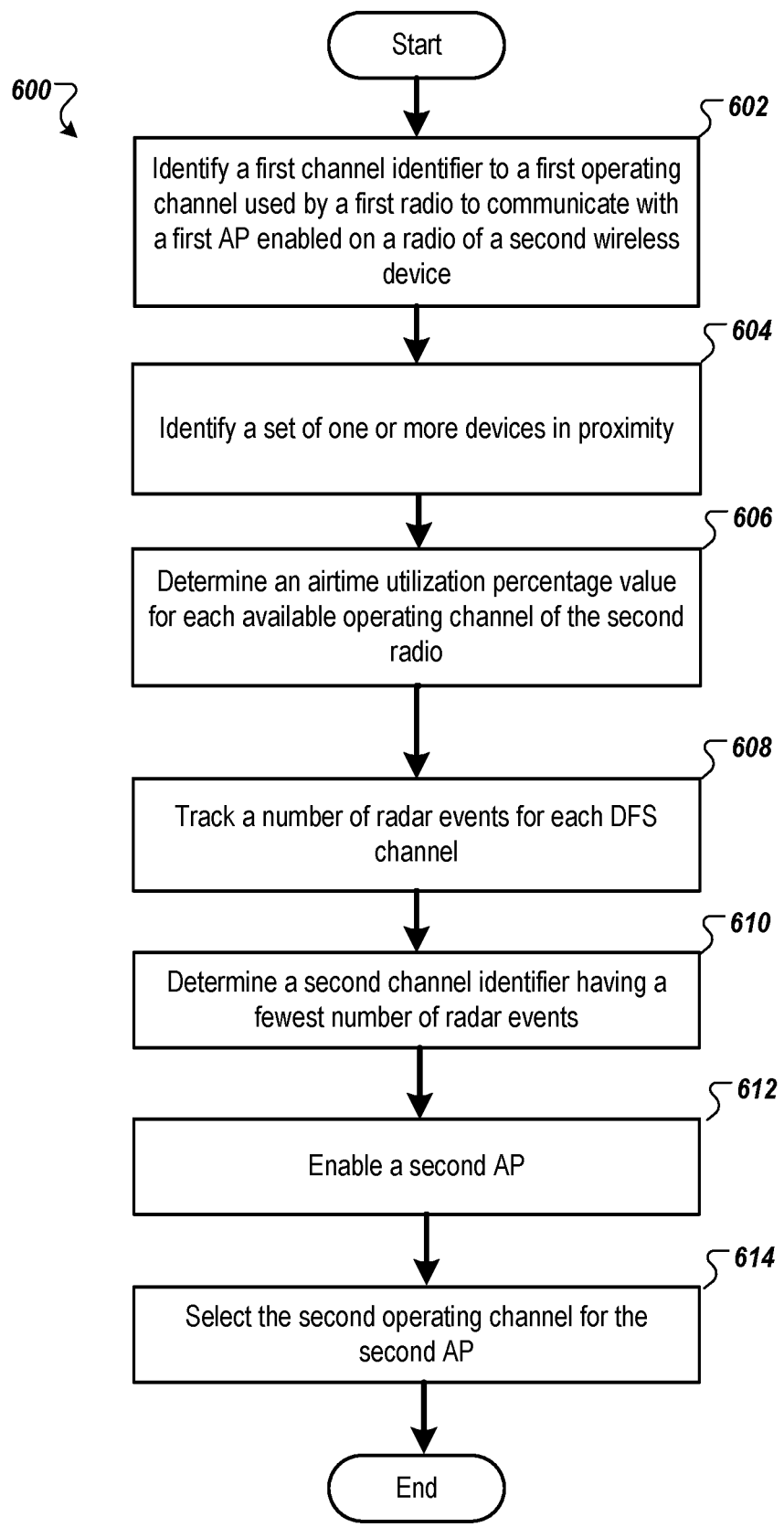
FIG. 6 is a flow diagram illustrating a method of secondary channel selection for a second radio of a wireless device based on a number or radar events recorded on each DFS channel according to one embodiment.

FIG. 6 is a flow diagram illustrating a method 600 of secondary channel selection for a second radio of a wireless device based on a number or radar events recorded on each DFS channel according to one embodiment. The method 600 may be performed by processing logic that comprises hardware (e.g., circuitry, dedicated logic, programmable logic, microcode, etc.), software, firmware, or a combination thereof. In one embodiment, the method 600 is performed by a processing device of a first wireless device described herein with respect to FIGS. 1-5.

Referring back to FIG. 6, the method 600 begins by the processing logic identifying a first channel identifier corresponding to a first operating channel being used by a first radio of the first wireless device to communicate with a first AP enabled on a radio of a second wireless device (block 602). The second wireless device operates as the first AP with respect to the first wireless device, as well as other devices in a first network (e.g., a first WLAN). The processing logic identifies a set of one or more devices in proximity to the first wireless device using a second radio (block 604). The processing logic determines an airtime utilization percentage value for each available operating channels of the second radio (block 606). The processing logic determines (e.g., tracks) a number of radar events for each of a subset of the operating channels, the subset including the DFS channels (block 608). The processing logic determines a second channel identifier having a fewest number of radar events during a specified period (block 610). The second channel identifier corresponds to a second operating channel of the second radio. The processing logic enable a second AP on the second radio (block 612) and selects the second operating channel for the second AP (block 614). The processing logic establishes a communication link with a third wireless device (e.g., one or more endpoint devices) using the second operating channel for the second AP. The second operating channel and the first operating channel are different to provide separation between the two operating channels of the two radios.

Figure 7:
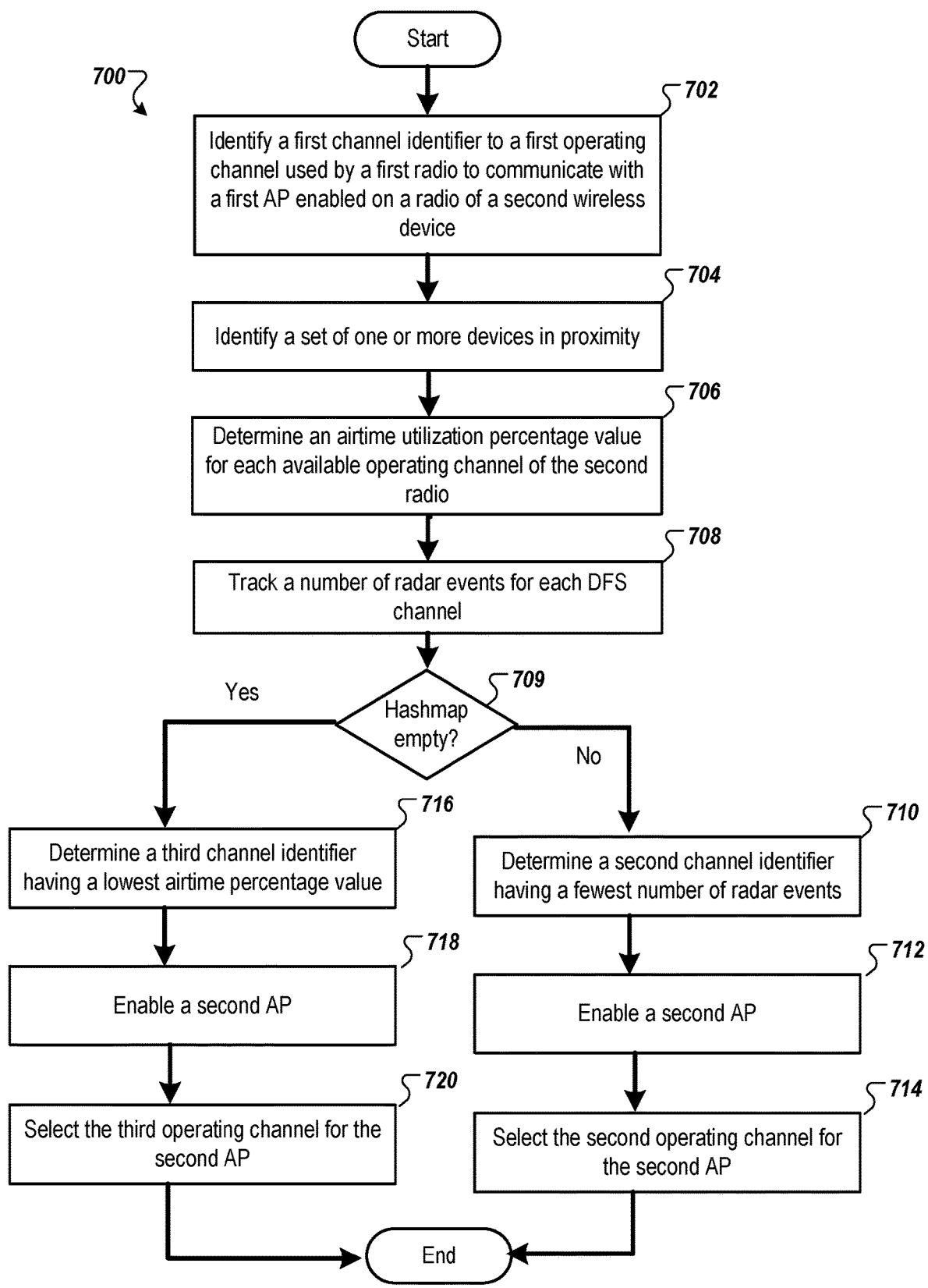
FIG. 7 is a flow diagram illustrating a method of secondary channel selection for a second radio of a wireless device according to another embodiment.

FIG. 7 is a flow diagram illustrating a method 700 of secondary channel selection for a second radio of a wireless device according to another embodiment. The method 700 may be performed by processing logic that comprises hardware (e.g., circuitry, dedicated logic, programmable logic, microcode, etc.), software, firmware, or a combination thereof. In one embodiment, the method 700 is performed by a processing device of a first wireless device described herein with respect to FIGS. 1-5.

Referring back to FIG. 7, the method 700 begins by the processing logic identifying a first channel identifier corresponding to a first operating channel being used by a first radio of the first wireless device to communicate with a first AP enabled on a radio of a second wireless device (block 702). The second wireless device operates as the first AP with respect to the first wireless device, as well as other devices in a first network (e.g., a first WLAN). The processing logic identifies a set of one or more devices in proximity to the first wireless device using a second radio (block 704). The processing logic determines an airtime utilization percentage value for each available operating channels of the second radio (block 706). The processing logic tracks a number of radar events for each of a subset of the operating channels, the subset including the DFS channels (block 708). At block 709, the processing logic determines whether a data structure (e.g., hashmap) is empty. That is, the processing logic determines whether any radar events have occurred and have been recorded in the data structure. Once a radar event occurs on a channel, the processing logic creates or updates the data structure. Responsive to the processing logic determining that the data structure is not empty at block 709, the processing logic determines a second channel identifier having a fewest number of radar events during a specified period (block 710). The second channel identifier corresponds to a second operating channel of the second radio. The processing logic enable a second AP on the second radio (block 712) and selects the second operating channel for the second AP (block 714); and the method 700 ends. However, responsive to the processing logic determining that the data structure is empty at block 709, the processing logic determines a third channel identifier with a lowest airtime utilization percentage value among those collected at block 706 (block 716). The third channel identifier corresponds to a third operating channel of the second radio. The processing logic enable a second AP on the second radio (block 718) and selects the third operating channel for the second AP (block 720); and the method 700 ends.

In other embodiments of the method 600 or method 700, the processing logic can receive first data on the first operating channel of the first radio from the second wireless device. The first data can be received as a result of a request, such as a media content request. The processing logic can process the first data and send second data on the second operating channel of the second radio to one or more endpoint devices. In implementation, the processing logic receives the first data from a router, a gateway, or other forwarding or routing device that has internet access (or access to a content library). The please sends audio data as the second data using the second radio to one or more speakers.

In one embodiment, the processing logic at block 709 of method 700 previously created the hashmap. At block 709, the processing logic determines whether the hashmap is empty. In some cases, the hashmap is considered empty if it has not been created yet. In other cases, the hashmap is created, but has null values and null keys. In one embodiment, the processing logic creates a first data structure that associates each channel identifier to the number of radar events for each of the subset of the operating channels. The subset can be the available DFS channels. In one embodiment, the first data structure can persist through a power loss event. The first data structure can be a hashmap, a list, a table, or the like. The data structure can include one or more entries, each entry storing at least a DFS channel identifier as a key and a count value representing a number of radar events recorded on a DFS channel corresponding to the respective DFS channel identifier. The processing logic can create a second data structure that stores the airtime utilization percentage value for each of the operating channels. The second data structure can include other statistics in connection with the operating channels.

Also, as described herein, the processing logic can select the second operating channel based on region. In these embodiment, the processing logic determines a region in which the first wireless device and/or the second wireless device are located. The processing logic selects the second operating channel based on the region and the second channel identifier having the fewest number of radar events. The processing logic determines the second channel identifier based on the region and the second channel identifier having the fewest number of radar events.

In another embodiment, the method 700 can determine at block 716 a third channel identifier at a first time and determine at block 710 the second channel identifier at a second time that is after the first time. Both the first time and the second time occur after the first channel identifier is determined, the first channel identifier corresponding to the first operating channel of the first radio. In one embodiment, the third channel identifier is determined based on the lowest airtime percentage value and the determined region. For example, the processing logic determines that the first AP is located in a first region and that the first operating channel is part of a 2.4 GHz WLAN band. The processing logic determines the second channel identifier responsive to determining that the first operating channel is part of the 2.4 GHz WLAN band and responsive to determining that the first AP is located in the first region. However, the second channel identifier can be determined according to different selection rules when the first AP is located in a second region, such as described above with respect to FIG. 4. For another example, the processing logic determines that the first AP is located in a first region and that the first operating channel is part of a 5 GHz WLAN band. The processing logic determines the second channel identifier responsive to determining that the first operating channel is part of the 5 GHz WLAN band and responsive to determining that the first AP is located in the first region. That is the second channel identifier, corresponding to the second operation channel that is farthest away in frequency from the first operating channel responsive to determining that the first operating channel is part of the 2.4 GHz WLAN band and responsive to determining that the first AP is located in the first region. The second operating channel can be part of the same 2.4 GHz WLAN band or part of any one of the 5 GHz WLAN bands. However, the second channel identifier can be determined according to different selection rules when the first AP is located in a second region, such as described above with respect to FIG. 4.

In another embodiment, the processing logic determines that the first AP is located in the first region and determines that the first operating channel is part of a 5 GHz. WLAN band. Instead of selecting the second operating channel for the second AP or instead of determining the second operating channel identifier having the fewest number of radar events, the processing logic determines a second airtime utilization percentage value for each of the operating channels of the second radio. The processing logic determines a third channel identifier having a lowest value of the second airtime utilization percentage values. The processing logic selects a third operating channel for the second AP, the third operating channel corresponding to the third channel identifier. The third operating channel and the first operating channel are different. The processing logic establishes a communication link with a third wireless device using the third operating channel for the second AP.

Figure 8:
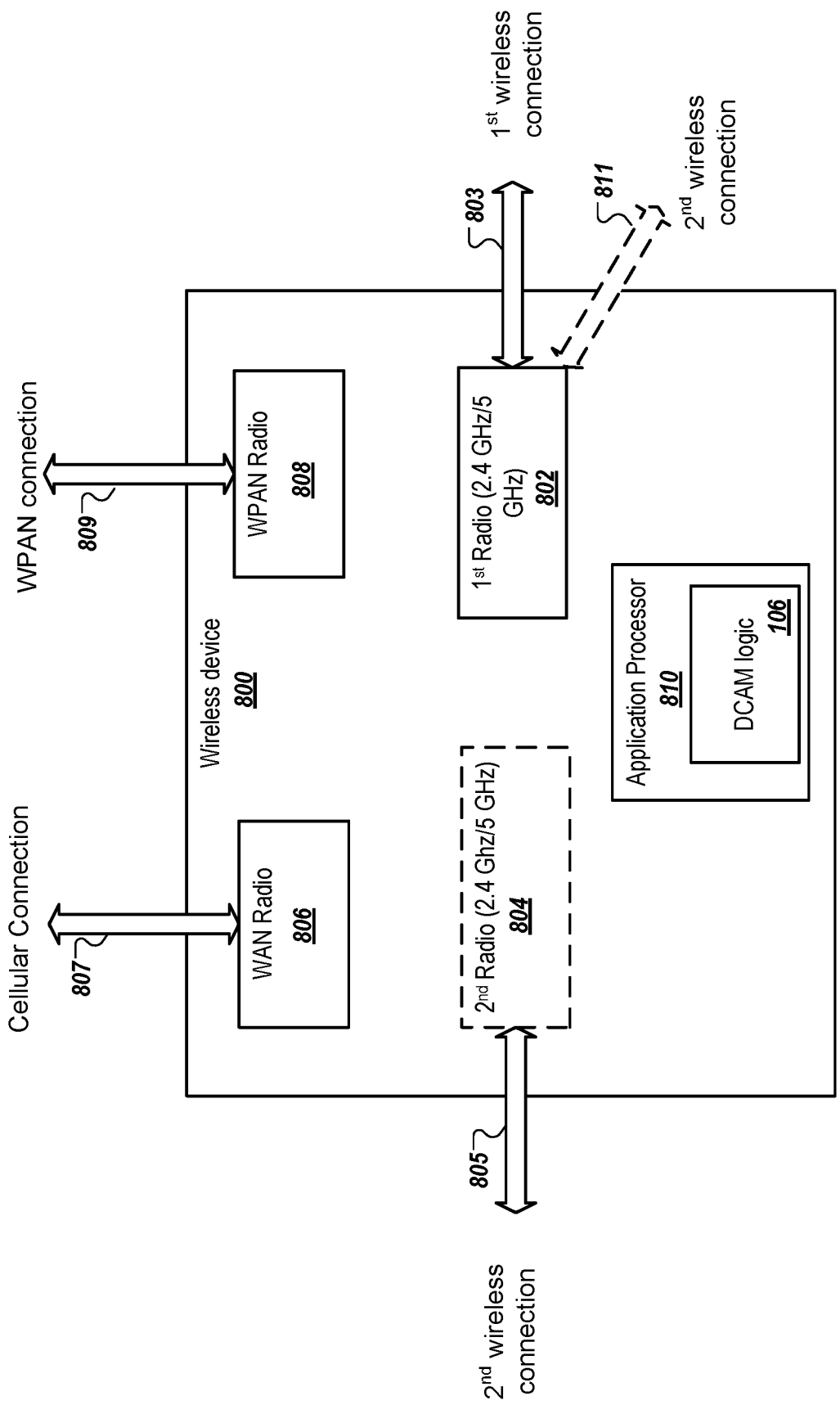
FIG. 8 is a block diagram of a wireless device with multiple radios according to one embodiment.

FIG. 8 is a block diagram of a wireless device 800 with multiple radios according to one embodiment. The wireless device 800 includes a first dual-band radio 802, a second dual-band radio 804, an optional cellular radio 806, an optional wireless personal area network (WPAN) radio 808, and an application processor 810. The application processor 810 can be any type of processing device that can implement operations associated with DCAM logic 106, such as described above with respect to FIGS. 1-7. The first dual-band radio 802 creates a first wireless connection 803 between the wireless device 800 and a second wireless device, such as a router or a gateway in a first network. The second dual-band radio 804 creates a second wireless connection 805 between the wireless device 800 and an endpoint device in a second network. The second wireless connection 805 can be a peer-to-peer wireless connection or a peer-to-multiple-peers wireless connections. The optional cellular radio 806 creates a cellular connection between the wireless device 800 and a device in a cellular network (not illustrated). The optional WPAN radio 808 can create a wireless connection between the wireless device 800 and a device in a WPAN. The WPAN radio 808 can be a radio that implements the Bluetooth® technology, ZigBee® technology, Zwave® technology, or the like.

In another embodiment, the wireless device 800 includes a single radio, such as the first radio 802 that establishes the first wireless connection 803 between the wireless device 800 and a second wireless device, such as a router or a gateway in a first network. The same first radio 802 establishes a second wireless connection 811 between the wireless device 800 and an endpoint device in a second network. The single radio can include an ability to create a soft AP using the same radio as being used for the first wireless connection 803. The DCAM logic 106 can be implemented in a wireless device with a single radio.

During operation, the wireless device 800 can receive a request to playback a first content file. The request may originate from an application running on the application processor 810. Alternatively, the wireless device 800 can request the content file on behalf of another client or endpoint device. The wireless device 800 sends a request for the first content file to the second wireless device through the first wireless connection 803 and receives the first content file in response. The wireless device 800 sends the content file, or portions of the content file, to the endpoint device over the second wireless connection 805. The endpoint device could be a speaker that receives audio data over the second wireless connection 805. The application processor 810 can process the first content file and send video data to a connected display. Alternatively, the application processor 810 can send the video over a wired or wireless connection to another device to be rendered on a display. In some embodiments, the wireless device 800 receives the first content file through one or more intervening devices between the wireless device and a content server of a content delivery network (CDN) or from a gateway of a home network.

In some embodiments, the wireless connections are WLAN connections that operate in a first frequency range (e.g., 2.4 GHz frequency band) or a second frequency range (e.g., any of the 5 GHz frequency bands).

In various embodiments, the wireless device 800 may include memory, storage, one or more wired communication interfaces, two or more wireless communication interfaces, one or more processing devices, or the like. The communication interface, which may include one or more network devices for connecting to the Internet, may be adapted to also wirelessly couple the wireless device 800 to one or more network devices of a first network (e.g., a home AP). The application processor 810 can process various data including, for example, topology information, such as node location, historical interference event data (e.g., which devices detected interference events on which channels), historical data transfer rate requirements (e.g., from applications on the client wireless devices), historical application-based throughput and latency requirements (e.g., by content streaming applications of the client wireless devices over particular channels), per-channel antenna configurations, and channel congestion data associated with particular channels on which the multiple wireless devices communicate. The data may further include information associated with, or useable to determine, pattern recognition and learning associated with radar event detection, data bandwidth requirements, and latency requirements, and the like. The data may also include scan lists, proximity data, DFS channels, requirement sets, or the like as described above with respect to FIG. 1-7.

In embodiments, the wireless device 800 includes a memory device that stores data, which are related to channels of the wireless devices and associated with topology information, channel congestion data, historical interference event data, historical application-based requirements information (e.g., historical application-based throughput and latency requirements), and per-channel antenna configurations. The memory device can also store data to be used for the DCAM logic 106, including the DFS channels, as well as fallback channels of the DFS channels. The wireless device 800 can communication with other devices on a network. The network may be representative of an Internet or WAN connection. Such an Internet or WAN connection may include additional links or trunks, whether wired or wireless, that may involve other types of wideband communication, including those based on cellular standard(s).

In various embodiments, the application processor 801 can include one or more modules, such as a coverage map manager, a registration manager, a radar event manager, DCAM module, ACCAM module, or the like. The coverage map data manager can collect information from the devices for purposes of generating and maintain coverage map data for the wireless device 800. The registration manager can handle registration requests by endpoint device(s) that are interested in radar event notifications so that the endpoint device(s) can use the DFS channels. These endpoint device (s) may not part of the first network, but are in proximity to wireless device 800. The endpoint device(s) may not have radar detection capability, but by registering with the registration manager, the endpoint device(s) can receive radar event notifications. The radar event manager can receive notifications regarding radar events from the devices. The radar event manager can assist in the endpoint device(s) receiving the radar event notifications when registered with the registration manager. It should be noted that the endpoint device(s) can receive the radar event notifications from other devices or from the radar event manager.

Figure 9:
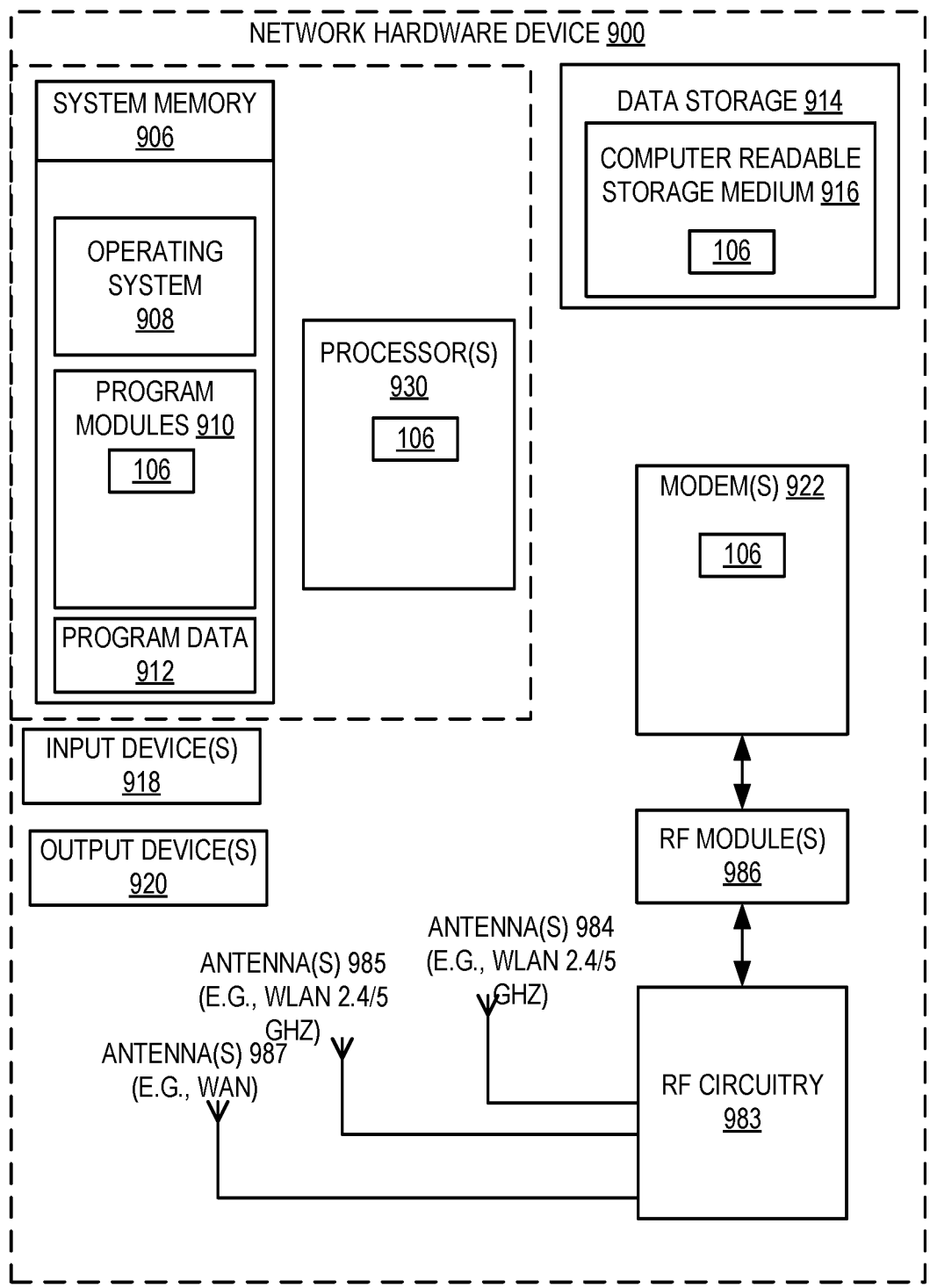
FIG. 9 is a block diagram of a wireless device for providing DFS channel assessment and selection according to one embodiment.

FIG. 9 is a block diagram of a wireless device 900 for providing DFS channel assessment and selection according to one embodiment. The wireless device 900 may correspond to the mesh network devices described above with respect to FIGS. 1-10. Alternatively, the wireless device 900 may be other electronic devices, as described herein.

The wireless device 900 includes one or more processor(s) 930, such as one or more CPUs, microcontrollers, field programmable gate arrays, or other types of processors. The wireless device 900 also includes system memory 906, which may correspond to any combination of volatile and/or non-volatile storage mechanisms. The system memory 906 stores information that provides operating system component 908, various program modules 910, program data 912, and/or other components. In one embodiment, the system memory 906 stores instructions of methods to control operation of the wireless device 900. The wireless device 900 performs functions by using the processor(s) 930 to execute instructions provided by the system memory 906. In one embodiment, the program modules 910 may include DCAM logic 106. The DCAM logic 106 may perform some of the operations of the channel selection processes descried herein.

The wireless device 900 also includes a data storage device 914 that may be composed of one or more types of removable storage and/or one or more types of non-removable storage. The data storage device 914 includes a computer-readable storage medium 916 on which is stored one or more sets of instructions embodying any of the methodologies or functions described herein. Instructions for the program modules 910 (e.g., DCAM logic 106) may reside, completely or at least partially, within the computer-readable storage medium 916, system memory 906 and/or within the processor(s) 930 during execution thereof by the wireless device 900, the system memory 906 and the processor(s) 930 also constituting computer-readable media. The wireless device 900 may also include one or more input devices 918 (keyboard, mouse device, specialized selection keys, etc.) and one or more output devices 920 (displays, printers, audio output mechanisms, etc.).

The wireless device 900 further includes a modem 922 to allow the wireless device 900 to communicate via a wireless connections (e.g., such as provided by the wireless communication system) with other computing devices, such as remote computers, an item providing system, and so forth. The modem 922 can be connected to one or more radio frequency (RF) modules 986. The RF modules 986 may be a WLAN module, a WAN module, PAN module, GPS module, or the like. The antenna structures (antenna(s) 984, 985, 987) are coupled to the RF circuitry 983, which is coupled to the modem 922. The RF circuitry 983 may include radio front-end circuitry, antenna switching circuitry, impedance matching circuitry, or the like. The antennas 984 may be GPS antennas, NFC antennas, other WAN antennas, WLAN or PAN antennas, or the like. The modem 922 allows the wireless device 900 to handle both voice and non-voice communications (such as communications for text messages, multimedia messages, media downloads, web browsing, etc.) with a wireless communication system. The modem 922 may provide network connectivity using any type of mobile network technology including, for example, cellular digital packet data (CDPD), general packet radio service (GPRS), EDGE, universal mobile telecommunications system (UMTS), 1 times radio transmission technology (1xRTT), evaluation data optimized (EVDO), high-speed down-link packet access (HSDPA), Wi-Fi®, Long Term Evolution (LTE) and LTE Advanced (sometimes generally referred to as 4G), etc.

The modem 922 may generate signals and send these signals to antenna(s) 984 of a first type (e.g., WLAN 5 GHz), antenna(s) 985 of a second type (e.g., WLAN 2.4 GHz), and/or antenna(s) 987 of a third type (e.g., WAN), via RF circuitry 983, and RF module(s) 986 as descried herein. Antennas 984, 985, 987 may be configured to transmit in different frequency bands and/or using different wireless communication protocols. The antennas 984, 985, 987 may be directional, omnidirectional, or non-directional antennas. In addition to sending data, antennas 984, 985, 987 may also receive data, which is sent to appropriate RF modules connected to the antennas. One of the antennas 984, 985, 987 may be any combination of the antenna structures described herein.

In one embodiment, the wireless device 900 establishes a first connection using a first wireless communication protocol, and a second connection using a different wireless communication protocol. The first wireless connection and second wireless connection may be active concurrently, for example, if a wireless device is receiving a media item from another wireless device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 922 is shown to control transmission and reception via antenna (984, 985, 987), the wireless device 900 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A first wireless device comprising:
    a first wireless local area network (WLAN) radio;
    a second WLAN radio; and
    an application processor coupled to the first WLAN radio and the second WLAN radio, wherein the application processor is configured to:
        establish a first wireless connection on a first channel with a second wireless device using the first WLAN radio, the second wireless device operating as a first access point (AP) and providing Internet access;
        at a first time after the first wireless connection is established:
            i) enable a second AP on the first wireless device using the second WLAN radio;
            ii) obtain first data from each of a plurality of nearby APs, the first data comprising an airtime utilization percentage value per channel for each of the plurality of nearby APs;
            iii) identify, in a hashmap, a first dynamic frequency selection (DFS) channel identifier having a lowest count value, the hashmap storing a plurality of entries, each entry storing a DFS channel identifier as a key and a count value that is a number of radar events recorded on a DFS channel corresponding to the respective DFS channel identifier; and
            iv) select a first DFS channel, corresponding to the first DFS channel identifier, wherein the first DFS channel is different than the first channel; and
        establish a second wireless connection with one or more third devices on the first DFS channel using the second WLAN radio.

2. The first wireless device of claim 1, wherein the application processor is further configured to:
    at a second time that is earlier than the first time and after the first wireless connection is established:
        i) enable the second AP using the second WLAN radio;
        ii) obtain second data from each of the plurality of nearby APs, the second data comprising a second airtime utilization percentage value per channel for each of the plurality of nearby APs;
        iii) determine that the hashmap has null data; and
        v) select a second channel for the second WLAN radio, wherein the second channel is different than the first channel; and
    establish the second wireless connection with the one or more third devices on the second channel using the second WLAN radio.

3. A method comprising:
    identifying, by a processing device of a first wireless device, a first channel identifier corresponding to a first operating channel being used by a first radio of the first wireless device to communicate with a first access point (AP) enabled on a second wireless device;
    identifying, by the processing device using a second radio, a plurality of devices in proximity to the first wireless device;
    determining, by the processing device, an airtime utilization percentage value for each of a plurality of operating channels of the second radio;
    determining, by the processing device, a number of radar events for each of a subset of the plurality of operating channels, the subset comprising dynamic frequency selection (DFS) channels;
    determining, by the processing device, a second channel identifier having a fewest number of radar events, the second channel identifier corresponding to a second operating channel;
    enabling, by the processing device, a second AP using the second radio; and
    establishing, by the processing device, a communication link with a third wireless device using the second operating channel for the second AP, wherein the second operating channel and the first operating channel are different.

4. The method of claim 3, further comprising:
receiving, by the processing device, first data on the first operating channel from the second wireless device, the second wireless device being a router; and
sending, by the processing device, second data on the second operating channel to the third wireless device, the third wireless device being a speaker.

5. The method of claim 3, further comprising:
creating, by the processing device, a first data structure that associates each channel identifier to the number of radar events for each of the subset of the plurality of operating channels, wherein the first data structure persists through a power loss event; and
creating, by the processing device, a second data structure that stores the airtime utilization percentage value for each of the plurality of operating channels.

6. The method of claim 5, wherein the first data structure is a hashmap that stores a plurality of entries, each entry storing a DFS channel identifier as a key and a number of radar events recorded on a DFS channel corresponding to the respective DFS channel identifier.

7. The method of claim 3, further comprising:
determining, by the processing device, a region in which the first wireless device and the second wireless device are located, wherein determining the second channel identifier comprises determining the second channel identifier based on the region and the second channel identifier having the fewest number of radar events.

8. The method of claim 3, wherein the determining the second channel identifier and establishing the communication link occur at a first time, wherein the method further comprises:
at a second time that is earlier than the first time:
i) enabling the second AP using the second radio;
ii) determining a second airtime utilization percentage value for each of the plurality of operating channels; and
iii) determining a third channel identifier having a lowest value of the second airtime utilization percentage values; and
iv) establishing a communication link with the third wireless device using a third operating channel for the second AP, wherein the third operating channel and the first operating channel are different.

9. The method of claim 8, further comprising:
determining, by the processing device, a region in which the first wireless device and the second wireless device are located, wherein determining the third channel identifier comprises determining the third channel identifier based on the region and the third channel identifier having the lowest value.

10. The method of claim 3, further comprising:
determining, by the processing device, that the first AP is located in a first region; and
determining, by the processing device, that the first operating channel is part of a 2.4 GHz wireless local area network (WLAN) band, wherein the determining the second channel identifier comprises determining that the second channel identifier, corresponding to the second operating channel, is a channel that is farthest away in frequency from the first operating channel responsive to determining that the first operating channel is part of the 2.4 GHz WLAN band and responsive to determining that the first AP is located in the first region.

11. The method of claim 3, further comprising:
determining, by the processing device, that the first AP is located in a first region; and
determining, by the processing device, that the first operating channel is part of a 2.4 GHz wireless local area network (WLAN) band, wherein the second operating channel is part of a 5 GHz WLAN band responsive to determining that the first operating channel is part of the 2.4 GHz WLAN band and responsive to determining that the first AP is located in the first region, wherein the second operating channel and the first operating channel are different.

12. The method of claim 3, further comprising:
determining, by the processing device, that the first AP is located in a first region; and
determining, by the processing device, that the first operating channel is part of a first 5 GHz wireless local area network (WLAN) band, wherein the second operating channel is part of a 2.4 GHz WLAN band or a second 5 GHz WLAN band responsive to determining that the first operating channel is part of the 5 GHz WLAN band and responsive to determining that the first AP is located in the first region, wherein the first 5 GHz WLAN band and the second 5 GHZ WLAN band are different.

13. The method of claim 3, further comprising:
determining, by the processing device, that the first AP is located in a first region;
determining, by the processing device, that the first operating channel is part of a 5 GHz wireless local area network (WLAN) band; and
instead of determining the second channel identifier having the fewest number of radar events,
i) determining a second airtime utilization percentage value for each of the plurality of operating channels; and
iii) determining a third channel identifier having a lowest value of the second airtime utilization percentage values; and
iv) establishing a communication link with the third wireless device using a third operating channel for the second AP, wherein the third operating channel and the first operating channel are different.

14. A first wireless device comprising:
a first radio;
a second radio;
a processing device coupled to the first radio and the second radio, wherein the processing device is to:
identify a first channel identifier corresponding to a first operating channel being used by the first radio to communicate with a first access point (AP) enabled on a second wireless device;
identify a plurality of devices in proximity to the first wireless device using the second radio;
determine an airtime utilization percentage value for each of a plurality of operating channels of the second radio;
determine a number of radar events for each of a subset of the plurality of operating channels, the subset comprising dynamic frequency selection (DFS) channels;
determine a second channel identifier having a fewest number of radar events, the second channel identifier corresponding to a second operating channel;
enable a second AP on the second radio; and
establish a communication link with a third wireless device using the second operating channel for the second AP, wherein the second operating channel and the first operating channel are different.

15. The first wireless device of claim 14, wherein the processing device is further to:
receive first data on the first operating channel from the second wireless device, the second wireless device being a router; and
send second data on the second operating channel to the third wireless device, the third wireless device being a speaker.

16. The first wireless device of claim 14, wherein the processing device is further to:
create a first data structure that associates each channel identifier to the number of radar events for each of the subset of the plurality of operating channels, wherein the first data structure persists through a power loss event; and
create a second data structure that stores the airtime utilization percentage value for each of the plurality of operating channels.

17. The first wireless device of claim 16, wherein the first data structure is a hashmap that stores a plurality of entries, each entry storing a DFS channel identifier as a key and a number of radar events recorded on a DFS channel corresponding to the respective DFS channel identifier.

18. The first wireless device of claim 14, wherein the processing device is further to:
determine a region in which the first wireless device and the second wireless device are located, wherein the second channel identifier is determined channel based on the region and the second channel identifier having the fewest number of radar events.

19. The first wireless device of claim 14, wherein the communication link is established with the third wireless device at a first time, wherein the processing device is further to:
at a second time that is earlier than the first time:
i) enable the second AP using the second radio;
ii) determine a second airtime utilization percentage value for each of the plurality of operating channels; and
iii) determine a third channel identifier having a lowest value of the second airtime utilization percentage values; and
iv) establish a communication link with the third wireless device using a third operating channel for the second AP, wherein the third operating channel and the first operating channel are different.

20. The first wireless device of claim 14, wherein the processing device is further to:
determine that the first AP is located in a first region; and
determine that the first operating channel is part of a 2.4 GHz wireless local area network (WLAN) band, wherein the second operating channel is a channel that is farthest away in frequency from the first operating channel responsive to the first operating channel being part of the 2.4 GHz WLAN band and responsive to the first AP being located in the first region.

* * * * *